United States Patent
Saruwatari et al.

(10) Patent No.: US 10,305,105 B2
(45) Date of Patent: *May 28, 2019

(54) NICKEL COBALT MANGANESE COMPOSITE HYDROXIDE AND PROCESS FOR PRODUCING SAME

(71) Applicant: SUMITOMO METAL MINING CO., LTD., Tokyo (JP)

(72) Inventors: Motoaki Saruwatari, Ehime (JP); Hiroko Oshita, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/538,146

(22) PCT Filed: Nov. 16, 2015

(86) PCT No.: PCT/JP2015/082149
§ 371 (c)(1),
(2) Date: Jun. 20, 2017

(87) PCT Pub. No.: WO2016/103975
PCT Pub. Date: Jun. 30, 2016

(65) Prior Publication Data
US 2017/0352884 A1 Dec. 7, 2017

(30) Foreign Application Priority Data

Dec. 22, 2014 (JP) ................. 2014-259061

(51) Int. Cl.
| H01M 4/02 | (2006.01) |
| H01M 4/36 | (2006.01) |
| C01G 53/00 | (2006.01) |
| H01M 4/505 | (2010.01) |
| H01M 4/525 | (2010.01) |

(52) U.S. Cl.
CPC .......... *H01M 4/525* (2013.01); *C01G 53/006* (2013.01); *C01G 53/40* (2013.01); *H01M 4/362* (2013.01); *H01M 4/505* (2013.01); *C01P 2004/54* (2013.01); *C01P 2004/61* (2013.01); *C01P 2006/12* (2013.01); *C01P 2006/40* (2013.01); *C01P 2006/80* (2013.01); *H01M 2004/028* (2013.01)

(58) Field of Classification Search
CPC .............................. C01G 53/04; C01G 53/006
See application file for complete search history.

(56) References Cited

U.S. PATENT DOCUMENTS

| 2007/0111098 A1 | 5/2007 | Yang Kook et al. |
| 2007/0298512 A1 | 12/2007 | Park et al. |
| 2011/0260099 A1 | 10/2011 | Paulsen et al. |
| 2012/0244413 A1 | 9/2012 | Shimano et al. |
| 2013/0314051 A1 | 11/2013 | Takezawa |
| 2014/0227594 A1 | 8/2014 | Song et al. |
| 2017/0305757 A1* | 10/2017 | Oshita .................... C01G 53/04 |

FOREIGN PATENT DOCUMENTS

| EP | 1 837 936 A2 | 9/2007 |
| EP | 2 128 915 A1 | 12/2009 |
| EP | 2 763 220 A2 | 8/2014 |
| JP | 2010-535699 A | 11/2010 |
| JP | 2011-124086 A | 6/2011 |
| JP | 2012-109191 A | 6/2012 |
| JP | 2013-171743 A | 9/2013 |
| JP | 2014-531719 A | 11/2014 |
| WO | 2012/020768 A1 | 2/2012 |

OTHER PUBLICATIONS

Feb. 2, 2016 International Search Report issued in International Patent Application No. PCT/JP2015/082149.
May 18, 2018 Extended Search Report issued in European Patent Application No. 15872544.0.

* cited by examiner

*Primary Examiner* — Peter F Godenschwager
(74) *Attorney, Agent, or Firm* — Oliff PLC

(57) ABSTRACT

A nickel cobalt manganese composite hydroxide with low impurity content and high reactivity when synthesizing a positive electrode active material, which can be used as a precursor of the positive electrode active material for non-aqueous electrolyte secondary batteries with low irreversible capacity, represented by a general formula: $Ni_xCo_yMn_zM_t(OH)_{2+a}$ (wherein x+y+z+t=1, 0.20≤x≤0.80, 0.10≤y≤0.50, 0.10≤z≤0.90, 0≤t≤0.10, 0≤a≤0.5, and M is at least one additive element selected from Mg, Ca, Al, Ti, V, Cr, Zr, Nb, Mo, W), which includes: spherical secondary particles formed by aggregation of a plurality of plate-shaped primary particles, which have an average particle diameter of 3 μm to 20 μm, a sulfate radical content of 1.0 mass % or less, a chlorine content of 0.5 mass % or less, and a carbonate radical content of 1.0 mass % to 2.5 mass %.

9 Claims, No Drawings

NICKEL COBALT MANGANESE COMPOSITE HYDROXIDE AND PROCESS FOR PRODUCING SAME

BACKGROUND OF THE INVENTION

Field of the Invention

The present invention relates to a nickel cobalt manganese composite hydroxide, and a process for producing the nickel cobalt manganese composite hydroxide. This application is based upon and claims the benefit of priority from prior Japanese Patent Application No. 2014-259061 filed on Dec. 22, 2014 in Japan.

Description of Related Art

In recent years, there has been a strong demand for the development of compact and lightweight non-aqueous electrolyte secondary batteries having a high energy density due to the widespread use of portable electronic devices such as mobile phones and notebook computers. Further, there has been a strong demand for the development of high-power secondary batteries as batteries for electric cars including hybrid cars. Examples of secondary batteries that satisfy such requirements include lithium ion secondary batteries. A lithium ion secondary battery includes a negative electrode, a positive electrode, and an electrolyte, and uses materials that can release and insert lithium as a negative electrode active material and a positive electrode active material.

Lithium ion secondary batteries are now actively being researched and developed. Particularly, lithium ion secondary batteries using a layered or spinel-type lithium metal composite oxide as a positive electrode material can provide a 4 V-class high voltage, and are therefore practically used as batteries having a high energy density.

Many lithium ion secondary batteries using a lithium cobalt composite oxide ($LiCoO_2$), which can be relatively easily synthesized, as a positive electrode material have been developed to achieve an excellent initial capacity characteristic and an excellent cycle characteristic, and various results have already been obtained. However, the lithium cobalt composite oxide is synthesized using a rare and expensive cobalt compound as a raw material, which increases not only the cost of an active material but also the cost of a battery. Therefore, there has been a demand for the development of an alternative to the lithium cobalt composite oxide as an active material.

As a new material of a positive electrode active material for lithium ion secondary batteries, a lithium manganese composite oxide ($LiMn_2O_4$) using manganese cheaper than cobalt, or a lithium nickel composite oxide ($LiNiO_2$) using nickel can be cited.

Not only the raw material of the lithium manganese composite oxide is inexpensive, but also the lithium manganese composite oxide is excellent in heat stability, so it can be said that the lithium manganese composite oxide is a powerful alternative material of the lithium cobalt composite oxide. However, geometric capacity of the lithium manganese composite oxide is only as about half of which of the lithium cobalt composite oxide, so the lithium manganese composite oxide is having a drawback that it is difficult to meet the demand for high capacity of lithium ion secondary batteries increasing every year by year.

On the other hand, the lithium nickel composite oxide is inferior in cycle characteristic to the lithium cobalt composite oxide, and also, the lithium nickel composite oxide is having a drawback that when it is used or stored in a high-temperature environment, its battery performance is relatively easy to be impaired.

Therefore, a lithium nickel cobalt manganese composite oxide having the same extent of heat stability and durability as the lithium cobalt composite oxide is becoming the powerful candidate as the alternative of the lithium cobalt composite oxide.

For example, a patent literature 1 proposes a nickel cobalt composite hydroxide represented by a general formula: $Ni_{1-x-y-z}Co_xMn_yM_z(OH)_2$ ($0<x\leq 1/3$, $0\leq y\leq 1/3$, $0\leq z\leq 0.1$, and M is one or more element selected from Mg, Al, Ca, Ti, V, Cr, Zr, Nb, Mo, W), a specific surface area of the nickel cobalt composite hydroxide measured by nitrogen adsorption BET method is 1.0 to 10.0 $m^2/g$, and also, a carbon content of the nickel cobalt composite hydroxide measured by high frequency-infrared combustion method is 0.1 mass % or less. According to the patent literature 1, when the carbon content exceeds 0.1 mass %, many impurities will be formed on a surface of a positive electrode active material, and an output of a battery cannot be obtained sufficiently, so a non-aqueous electrolyte secondary battery excellent in heat stability, and also, excellent in battery characteristic can be obtained by using a lithium nickel composite oxide, which is obtained from proposed nickel cobalt composite hydroxide as a precursor, as a positive electrode active material.

However, in the patent literature 1, it is focusing on the carbon content, but it is not considering about the other impurities, so composite hydroxide capable of achieving further high capacity of positive electrode active material is demanded.

Also, a patent literature 2 proposes a process for producing a nickel-cobalt-M element-containing composite compound wherein the nickel-cobalt-M element-containing composite compound is formed by pyrolyzing a nickel ammine complex and a cobalt ammine complex by heating the nickel-cobalt-M element-containing aqueous solution or aqueous dispersion obtained by mixing the nickel ammine complex, the cobalt ammine complex and M element source. According to the patent literature 2, in a coprecipitation process neutralizing by alkali, sulfate ion ($SO_4^{2-}$) and chloride ion ($Cl^-$) which are anion of salt used in raw material and sodium ion ($Na^+$) contained in alkali used for neutralization are difficult to be cleaned, and these ions remain in a positive electrode material as impurities. On the other hand, in nickel-cobalt-M element-containing composite compound proposed in the patent literature 2, content of impurities such as sulfate radical, chlorine, sodium, and iron is extremely low, so a positive electrode active material obtained using this composite compound expresses excellent battery performance.

However, in the patent literature 2, the nickel-cobalt-M element-containing composite compound is obtained by pyrolysis, so it is difficult to narrow a particle size distribution or to achieve spherical shape of particles, therefore it is difficult to say that the obtained positive electrode active material can obtain a sufficient battery characteristic.

Patent Literature 1: JP 2013-171743 A
Patent Literature 2: WO2012/020768

SUMMARY OF THE INVENTION

A lithium nickel cobalt manganese composite oxide is usually produced from a step for mixing a nickel cobalt manganese composite hydroxide and a lithium compound and calcining the mixture. The nickel cobalt manganese composite hydroxide contains impurities such as sulfate radical derived from raw material in its production step. These impurities tend to inhibit a reaction with lithium in a step for mixing the lithium compound and calcining the mixture, and decreases crystallinity of the lithium nickel cobalt manganese composite oxide in layered structure. The lithium nickel cobalt manganese composite oxide with low crystallinity is having a problem that a capacity will be decreased by inhibiting an expansion of lithium in a solid phase when composing a battery as a positive electrode active material.

Further, impurities contained in the nickel cobalt manganese composite hydroxide mixes with the lithium compound and remains in the lithium nickel cobalt manganese composite oxide even after calcination. These impurities do not contribute to charge-discharge reaction, so when composing a battery, it is obliged to use excess negative electrode material in a battery to the amount corresponding to irreversible capacity of the positive electrode active material, and as a result, capacity per volume and per weight as an entire battery decreases. Therefore, the lithium nickel cobalt manganese composite oxide with lower impurity content is demanded, but in order to achieve it, the nickel cobalt manganese composite hydroxide with low impurity content is necessary. Also, high reactivity is also necessary when mixing with the lithium compound and calcining the mixture, in order to obtain the lithium nickel cobalt manganese composite oxide with high crystallinity.

Purpose of the present invention is to provide a nickel cobalt manganese composite hydroxide as a precursor of a positive electrode active material capable of obtaining a non-aqueous electrolyte secondary battery with high capacity by increasing the reactivity with a lithium compound by decreasing an amount of impurities, which do not contribute to charge-discharge reaction, and which will be a cause for inhibiting reaction with lithium, and also, to provide its production process.

The present inventors accomplished the present invention, by earnest investigation, by finding that it is possible to decrease impurities such as sulfate radical by making alkali solution into a mixed solution of alkali metal hydroxide and carbonate in a step for producing nickel cobalt manganese composite hydroxide by crystallization reaction.

In other words, a nickel cobalt manganese composite hydroxide of the present invention is represented by a general formula: $Ni_xCo_yMn_zM_t(OH)_{2+a}$ (wherein $x+y+z+t=1$, $0.20 \leq x \leq 0.80$, $0.10 \leq y \leq 0.50$, $0.10 \leq z \leq 0.90$, $0 \leq t \leq 0.10$, $0 \leq a \leq 0.5$, and M is at least one additive element selected from Mg, Ca, Al, Ti, V, Cr, Zr, Nb, Mo, W), the nickel cobalt manganese composite hydroxide comprising: spherical secondary particles formed by aggregation of a plurality of plate-shaped primary particles, wherein the secondary particles have an average particle diameter of 3 μm to 20 μm, a sulfate radical content of 1.0 mass % or less, a chlorine content of 0.5 mass % or less, and a carbonate radical content of 1.0 mass % to 2.5 mass %.

Also, it is preferable that a value of [(d90−d10)/average particle diameter], which is an index indicating the dispersion of particle size distribution of the nickel cobalt manganese composite hydroxide, is 0.55 or less.

Also, it is preferable that a specific surface area of the nickel cobalt manganese composite hydroxide is 5 to 60 $m^2/g$.

A process for producing a nickel cobalt manganese composite hydroxide of the present invention is a process for producing a nickel cobalt manganese composite hydroxide represented by a general formula: $Ni_xCo_yMn_zM_t(OH)_{2+a}$ (wherein $x+y+z+t=1$, $0.20 \leq x \leq 0.80$, $0.10 \leq y \leq 0.50$, $0.10 \leq z \leq 0.90$, $0 \leq t \leq 0.10$, $0 \leq a \leq 0.5$, and M is at least one additive element selected from Mg, Ca, Al, Ti, V, Cr, Zr, Nb, Mo, W) by a crystallization reaction, the process comprising: a crystallization step in which crystallization is performed in a reaction solution obtained by adding an alkali solution to an aqueous solution containing a mixed aqueous solution containing at least nickel, cobalt and manganese, and an ammonium ion supplier, wherein the alkali solution is a mixed aqueous solution of an alkali metal hydroxide and a carbonate, and a ratio of the carbonate to the alkali metal hydroxide in the mixed aqueous solution represented by $[CO_3^{2-}]/[OH^-]$ is 0.002 or more and 0.050 or less.

Also, the crystallization step comprises a nucleation step and a particle growth step, and wherein in the nucleation step, a nucleation is performed in the reaction solution obtained by adding the alkali solution to the aqueous solution so that a pH of the reaction solution is 12.0 to 14.0 as a pH measured on the basis of a liquid temperature of 25° C., and in the particle growth step, it is preferable to add the alkali solution to the reaction solution containing nuclei formed in the nucleation step so that a pH of the reaction solution is 10.5 to 12.0 as a pH measured on the basis of a liquid temperature of 25° C.

Also, it is preferable that the alkali metal hydroxide includes at least one of lithium hydroxide, sodium hydroxide, and potassium hydroxide.

Also, it is preferable that the carbonate includes at least one of sodium carbonate, potassium carbonate, and ammonium carbonate Also, in the crystallization step, it is preferable to maintain an ammonia concentration of each aqueous solution within a range of 3 g/L to 25 g/L.

Also, it is preferable to maintain a reaction temperature within a range of 20° C. to 80° C.

By the present invention, it is possible to obtain the nickel cobalt manganese composite hydroxide with low impurity content and with high reactivity when synthesizing the positive electrode active material, and which can be used as a precursor of the positive electrode active material for non-aqueous electrolyte secondary batteries with a low irreversible capacity. In addition, the process for producing nickel cobalt manganese composite hydroxide is easy and having high productivity, so its industrial value is extremely high.

DETAILED DESCRIPTION OF THE INVENTION

Hereinafter, it is explained in detail about the embodiments of the present invention in the following order. In addition, the following explained embodiments are only exemplifications, and a nickel cobalt manganese composite hydroxide of the present invention and a process for producing a nickel cobalt manganese composite hydroxide of the present invention can be performed in the configurations with various modifications and improvements based on the knowledge of those who skilled in the art, beginning with the embodiments.

1. Nickel cobalt manganese composite hydroxide
2. Process for producing nickel cobalt manganese composite hydroxide <1. Nickel Cobalt Manganese Composite Hydroxide>

A nickel cobalt manganese composite hydroxide of the present invention is represented by a general formula: $Ni_xCo_yMn_zM_t(OH)_{2+a}$ (wherein $x+y+z+t=1$, $0.20 \leq x \leq 0.80$, $0.10 \leq y \leq 0.50$, $0.10 \leq z \leq 0.90$, $0 \leq t \leq 0.10$, $0 \leq a \leq 0.5$, and M is at least one additive element selected from Mg, Ca, Al, Ti, V, Cr, Zr, Nb, Mo, W), and the nickel cobalt manganese composite hydroxide including spherical secondary particles formed by aggregation of a plurality of plate-shaped primary particles, wherein the secondary particles have an average particle diameter of 3 µm to 20 µm, a sulfate radical content of 1.0 mass % or less, a chlorine content of 0.5 mass % or less, and a carbonate radical content of 1.0 mass % to 2.5 mass %. Hereinafter, features of each element are explained in detail.

[Composition of Particle]

A nickel cobalt manganese composite hydroxide of the present invention is adjusted to have a composition represented by a general formula: $Ni_xCo_yMn_zM_t(OH)_{2+a}$ (wherein $x+y+z+t=1$, $0.20 \leq x \leq 0.80$, $0.10 \leq y \leq 0.50$, $0.10 \leq z \leq 0.90$, $0 \leq t \leq 0.10$, $0 \leq a \leq 0.5$, and M is at least one additive element selected from Mg, Ca, Al, Ti, V, Cr, Zr, Nb, Mo, W).

In the general formula, it is preferable that x indicating a nickel content is $0.20 \leq x \leq 0.80$. Also, it is more preferable that x indicating a nickel content is $x \leq 0.6$ when considering electric characteristic and heat stability.

Next, in the general formula, it is preferable that y indicating a cobalt content is $0.10 \leq y \leq 0.50$. It is possible to reduce expansion and shrinkage behavior of crystal lattice by insertion and separation of lithium involving charge and discharge or cycle characteristic by adding cobalt properly, but when y is less than 0.10, it is not possible to achieve sufficient reduction effect of expansion and shrinkage behavior of crystal lattice, so it is not preferable. On the other hand, when cobalt content is too high and y exceeds 0.50, reduction of initial discharge capacity will be too high, and there is a problem that it will be disadvantageous in cost, so it is not preferable.

In addition, it is preferable that z indicating a manganese content is $0.10 \leq z \leq 0.90$. When manganese is added in this range, it is possible to improve safety and durability of a battery if it is used as a positive electrode active material of the battery. When z is less than 0.10, it is not possible to achieve sufficient effect of improving safety and durability of the battery, on the other hand, when z exceeds 0.90, metal elements contributing to Redox reaction will be reduced and battery capacity will be deceased, so it is not preferable.

The additive element M is one or more element selected from Mg, Al, Ca, Ti, V, Cr, Zr, Nb, Mo, W, and it is added to improve battery characteristic such as cycle characteristic or output characteristic. It is preferable that t indicating a content of additive element M is $0 \leq t \leq 0.10$. When t exceeds 0.10, metal elements contributing to Redox reaction will be reduced and battery capacity will be deceased, so it is not preferable.

A process for analyzing composition is not particularly limited, but it can be determined from chemical analysis by ICP emission spectroscopy.

[Particle Structure]

The nickel cobalt manganese composite hydroxide includes spherical secondary particles formed by aggregation of a plurality of primary particles. The primary particles constituting the secondary particles may have various shapes such as a plate shape, a needle-like shape, a rectangular parallelepiped shape, an elliptical shape, and a rhombohedral shape. Further, the primary particles may be aggregated in random directions. Alternatively, the primary particles aggregated radially from the center along the major axis direction thereof may also be applicable in the present invention.

The secondary particles are preferably formed by aggregation of a plurality of plate shaped and/or needle-like shaped primary particles in random directions. The reason for this is that when the secondary particles have such a structure, voids are substantially uniformly created among the primary particles, and therefore when the nickel cobalt manganese composite hydroxide is mixed with a lithium compound and the mixture is calcined, the fused lithium compound is distributed in the secondary particles so that lithium is satisfactorily diffused.

It is to be noted that a process for observing the shapes of the primary particles and the secondary particles is not particularly limited, but the primary particles and the secondary particles may be measured by observing the cross-section of the nickel cobalt manganese composite hydroxide with a scanning electron microscope.

[Average Particle Diameter]

The nickel cobalt manganese composite hydroxide is adjusted to have an average particle diameter of 3 µm to 20 µm. If the average particle diameter is less than 3 µm, the filling density of particles in a positive electrode formed using a resulting positive electrode active material is reduced so that battery capacity per volume of the positive electrode is undesirably reduced. On the other hand, if the average particle diameter exceeds 20 µm, the specific surface area of a resulting positive electrode active material is reduced so that the interface between the positive electrode active material and an electrolyte of a battery is reduced, which undesirably increases the resistance of a positive electrode and deteriorates the output characteristic of the battery. Therefore, when the average particle diameter of the nickel cobalt manganese composite hydroxide is adjusted to 3 to 20 µm, preferably 3 to 15 µm, more preferably 4 to 12 µm, a battery having a positive electrode using a resulting positive electrode active material can have a high battery capacity per volume, a high level of safety, and an excellent cycle characteristic.

A method for measuring the average particle diameter is not particularly limited. For example, the average particle diameter may be determined from a volumetric integration value measured by a laser light diffraction-scattering-type particle size analyzer.

[Impurity Content]

The nickel cobalt manganese composite hydroxide contains sulfate radicals and chlorine. The nickel cobalt manganese composite hydroxide has a sulfate radical content of 1.0 mass % or less, preferably 0.6 mass % or less and a chlorine content of 0.5 mass % or less, preferably 0.3 mass % or less. Here, the sulfate radicals and chlorine contained in nickel cobalt manganese composite hydroxide particles are derived from raw materials used in a crystallization step that will be described later.

If the sulfate radical content of the nickel cobalt manganese composite hydroxide exceeds 1.0 mass %, in the step of mixing with a lithium compound and calcining the mixture, a reaction with lithium is inhibited, which reduces the crystallinity of a resulting lithium nickel cobalt manganese composite oxide having a layered structure. Such a lithium nickel cobalt manganese composite oxide having low crystallinity causes a problem that when a battery is produced using it as a positive electrode material, lithium diffusion in a solid phase is inhibited so that the capacity of the battery is reduced. Further, the impurities contained in the nickel cobalt manganese composite hydroxide remain even in a lithium nickel cobalt manganese composite oxide obtained by mixing the nickel cobalt manganese composite hydroxide with a lithium compound and calcining the mixture. These impurities do not contribute to a charge-discharge reaction, and therefore when a battery is produced, an excess negative electrode material has to be used which corresponds to the irreversible capacity of a positive electrode material. As a result, the capacity of the battery as a whole per weight and volume is reduced, and excess lithium accumulated in a negative electrode as an irreversible capacity is a problem also in terms of safety.

On the other hand, if the chlorine content exceeds 0.5 mass %, there are a problem such as a reduction in battery capacity and a safety problem as described above with reference to the sulfate radical. Further, chlorine remains in a resulting lithium nickel cobalt manganese composite oxide mainly in the form of LiCl or NaCl. They are highly hygroscopic and therefore allow moisture to enter a battery, which causes a deterioration of the battery.

[Carbonate Radical Content]

The nickel cobalt manganese composite hydroxide has a carbonate radical content of 1.0 mass % to 2.5 mass %. Here, carbonate radicals contained in the nickel cobalt manganese composite hydroxide are derived from a carbonate used in a crystallization step that will be described later. Further, the carbonate radicals are volatilized in the step of mixing the nickel cobalt manganese composite hydroxide with a lithium compound and calcining the mixture, and therefore do not remain in a resulting lithium nickel cobalt manganese composite oxide used as a positive electrode material. When the carbonate radical content of the nickel cobalt manganese composite hydroxide is in the range of 1.0 mass % to 2.5 mass %, pores are formed in the particles of the nickel cobalt manganese composite hydroxide by volatilization of carbonate radicals contained in the nickel cobalt manganese composite hydroxide during calcination of a mixture of the nickel cobalt manganese composite hydroxide and a lithium compound so that the nickel cobalt manganese composite hydroxide can appropriately come into contact with the fused lithium compound, which appropriately proceeds crystal growth of a lithium nickel cobalt manganese composite oxide. The carbonate radical content may be determined by, for example, measuring the total carbon element content of the nickel cobalt manganese composite hydroxide and converting the measured total carbon element content into the amount of $CO_3$.

On the other hand, if the carbonate radical content is less than 1.0 mass %, when the nickel cobalt manganese composite hydroxide is mixed with a lithium compound and the mixture is calcined, the nickel cobalt manganese composite hydroxide is in insufficient contact with the fused lithium compound. Therefore, a resulting lithium nickel cobalt manganese composite oxide has low crystallinity, and when a battery is produced using such a lithium nickel cobalt manganese composite oxide as a positive electrode material, there is a problem that the capacity of the battery is reduced due to inhibition of Li diffusion in a solid phase. If the carbonate radical content exceeds 2.5 mass %, in the step of mixing the nickel cobalt manganese composite hydroxide with a lithium compound and calcining the mixture to obtain a lithium nickel cobalt manganese composite oxide, generated carbon dioxide gas inhibits a reaction, which reduces the crystallinity of the lithium nickel cobalt manganese composite oxide.

[Particle Size Distribution]

The nickel cobalt manganese composite hydroxide is preferably adjusted so that the value of [(d90−d10)/average particle diameter], which is an index indicating the dispersion of particle size distribution of particles, is 0.55 or less.

When the nickel cobalt manganese composite hydroxide has a wide particle size distribution and therefore the value of [(d90−d10)/average particle diameter], which is an index indicating the dispersion of particle size distribution, exceeds 0.55, the nickel cobalt manganese composite hydroxide contains many fine particles whose particle diameters are much smaller than the average particle diameter or many particles (large-diameter particles) whose particle diameters are much larger than the average particle diameter. When a positive electrode is formed using a positive electrode active material containing many fine particles, there is a possibility that a local reaction of the fine particles occurs so that heat is generated, which is undesirable because safety is reduced and a cycle characteristic is deteriorated due to selective degradation of the fine particles having a large specific surface area. On the other hand, when a positive electrode is formed using a positive electrode active material containing many large-diameter particles, an adequate reaction area between an electrolyte and the positive electrode active material is not provided so that the output of a battery is undesirably reduced due to an increase in reaction resistance.

Therefore, when the particle size distribution of the positive electrode active material is adjusted so that the value of the index [(d90−d10)/average particle diameter], is 0.55 or less, the ratio of fine particles or large-diameter particles is low, and therefore a battery having a positive electrode using this positive electrode active material can have a high level of safety and an excellent cycle characteristic and can output a high power.

It is to be noted that in [(d90−d10)/average particle diameter] that is an index indicating the dispersion of particle size distribution, d10 means a particle diameter at which the cumulative volume of particles reaches 10% of the total volume of all the particles when the number of particles is counted from a small particle size side. Further, d90 means a particle diameter at which the cumulative volume of particles reaches 90% of the total volume of all the particles when the number of particles is counted from a small particle size side.

A process for determining the average particle diameter, d90, and d10 is not particularly limited. For example, the average particle diameter, d90, and d10 may be determined from a volumetric integration value measured by a laser light diffraction-scattering-type particle size analyzer.

[Specific Surface Area]

The nickel cobalt manganese composite hydroxide is preferably adjusted to have a specific surface area of 5 $m^2$/g to 60 $m^2$/g, more preferably adjusted to have a specific surface area of 5 $m^2$/g to 50 $m^2$/g. This is because when the nickel cobalt manganese composite hydroxide having a specific surface area in the above range is mixed with a lithium compound and the mixture is calcined, the particles of the nickel cobalt manganese composite hydroxide can have a sufficient surface area to come into contact with the fused lithium compound. On the other hand, if the specific surface area is less than 5 $m^2$/g, there is a problem that when the nickel cobalt manganese composite hydroxide is mixed with a lithium compound and the mixture is calcined, the nickel cobalt manganese composite hydroxide cannot sufficiently come into contact with the fused lithium compound so that a resulting lithium nickel cobalt manganese composite oxide has low crystallinity, which reduces the capacity of a battery using the lithium nickel cobalt manganese composite oxide as a positive electrode material due to inhibition of Li diffusion in a solid phase. If the specific surface area exceeds 60 $m^2$/g, when the nickel cobalt manganese composite hydroxide is mixed with a lithium compound and the mixture is calcined, crystal growth excessively proceeds so that nickel enters the lithium layers of a resulting lithium transition metal composite oxide that is a layered compound, that is, cation mixing occurs, which undesirably reduces a charge-discharge capacity.

[Positive Electrode Active Material for Non-Aqueous Electrolyte Secondary Battery]

A lithium nickel cobalt manganese composite oxide can be formed by mixing a nickel cobalt manganese composite hydroxide and a lithium compound and by calcining the mixture. The lithium nickel cobalt manganese composite oxide can be used as a raw material of a positive electrode active material of a non-aqueous electrolyte secondary battery.

In the lithium nickel cobalt manganese composite oxide used as the positive electrode active material, the carbonate radicals are volatilized in calcination after mixing the nickel cobalt manganese composite hydroxide with the lithium compound, but for other components and particle size distribution, the lithium nickel cobalt manganese composite oxide takes over the properties of the nickel cobalt manganese composite hydroxide, which is a precursor. The nickel cobalt manganese composite hydroxide is having a sulfate radical content of 1.0 mass % or less, preferably 0.6 mass % or less, and a chlorine content of 0.5 mass % or less, preferably 0.3 mass % or less. Also, the nickel cobalt manganese composite hydroxide is having an average particle diameter of 3 μm to 25 μm. Therefore, a battery having a positive electrode using a resulting positive electrode active material can have a high battery capacity per volume, a high level of safety, and an excellent cycle characteristic.

Also, the value of [(d90−d10)/average particle diameter], which is an index indicating the dispersion of particle size distribution of the nickel cobalt manganese composite hydroxide, is 0.55 or less, and the ratio of fine particles or large-diameter particles is low, therefore a battery having a positive electrode using the positive electrode active material comprising this nickel cobalt manganese composite hydroxide as raw material can have a high level of safety and an excellent cycle characteristic and can output a high power.

<2. Process for Producing Nickel Cobalt Manganese Composite Hydroxide>

Process for producing a nickel cobalt manganese composite hydroxide of the present invention is a process in which, for example the above the nickel cobalt manganese composite hydroxide is produced by a crystallization reaction. Process for producing the nickel cobalt manganese composite hydroxide comprises a crystallization step for crystallizing in a reaction solution obtained by adding an alkali solution to an aqueous solution containing a mixed aqueous solution containing at least nickel, cobalt and manganese, and an ammonium ion supplier, wherein the alkali solution is a mixed aqueous solution of an alkali metal hydroxide and a carbonate, and a ratio of the carbonate to the alkali metal hydroxide in the mixed aqueous solution represented by $[CO_3^{2-}]/[OH^-]$ is 0.002 or more but 0.050 or less.

Also, the crystallization step comprises a nucleation step and a particle growth step, and in the nucleation step, a nucleation is performed in a reaction solution obtained by adding the alkali solution to the aqueous solution so that a pH of the reaction solution is 12.0 to 14.0 as a pH measured on the basis of a liquid temperature of 25° C., and in the particle growth step, it is preferable to add the alkali solution to the reaction solution containing the nuclei formed in the nucleation step so that a pH of the reaction solution is 10.5 to 12.0 as a pH measured on the basis of a liquid temperature of 25° C.

In a conventional continuous crystallization process, a nucleation reaction and a particle growth reaction proceed at the same time in the same reaction vessel, and therefore a nickel composite hydroxide having a wide particle size distribution is obtained. On the other hand, in the process for producing a nickel cobalt manganese composite hydroxide, the time when a nucleation reaction mainly occurs (nucleation step) and the time when a particle growth reaction mainly occurs (particle growth step) are clearly separated from each other. Therefore, even when both steps are performed in the same reaction vessel, the composite hydroxide having a narrow particle size distribution can be obtained. Also, it is possible to reduce impurities such as sulfate radical by using a mixed solution of an alkali metal hydroxide and a carbonate as the alkali solution.

Hereinafter, explaining in detail about a condition and a material to be used in a process for producing a nickel cobalt manganese composite hydroxide.

[Mixed Aqueous Solution Containing Nickel, Cobalt and Manganese]

A salt used in a mixed aqueous solution containing nickel, cobalt and manganese such as nickel salt, cobalt salt or manganese salt are not particularly limited as long as it is a water-soluble compound, but sulfate, nitrate, chloride and else may be used. For example, nickel sulfate, cobalt sulfate and manganese sulfate are preferably used.

Also, it is possible to form a mixed aqueous solution by mixing a compound containing one or more additive element at a predetermined ratio according to need. In the crystallization step, it is preferable to use a water-soluble compound containing one or more additive element selected from Mg, Ca, Al, Ti, V, Cr, Zr, Nb, Mo, W, and for example, titanium sulfate, ammonium peroxotitanate, titanium potassium oxalate, vanadium sulfate, ammonium vanadate, chromium sulfate, potassium chromate, zirconium sulfate, zirconium nitrate, niobium oxalate, ammonium molybdate, sodium tungstate, ammonium tungstate and else may be used.

Also, the nickel cobalt manganese composite hydroxide may be coated with a compound containing additive element by adjusting a pH of slurry obtained by mixing the nickel cobalt manganese composite hydroxide obtained by crystallization with the aqueous solution containing additive element.

The concentration of the mixed aqueous solution is preferably 1 mol/L to 2.6 mol/L, more preferably 1 mol/L to 2.2 mol/L as the total concentration of the metal salts. If the concentration of the mixed aqueous solution is less than 1 mol/L, the concentration of resulting hydroxide slurry is low, which deteriorates productivity. On the other hand, if the concentration of the mixed aqueous solution exceeds 2.6 mol/L, there is a fear that crystal precipitation or freezing occurs at −5° C. or less so that pipes of equipment are clogged, and therefore the pipes need to be kept warm or heated, which increases costs.

Further, the amount of the mixed aqueous solution to be supplied to the reaction vessel is adjusted so that the concentration of a crystallized product at the time when the crystallization reaction is terminated is generally 30 g/L to 250 g/L, preferably 80 g/L to 150 g/L. If the concentration of a crystallized product is less than 30 g/L, there is a case where primary particles are poorly aggregated. If the concentration of a crystallized product exceeds 250 g/L, there is a case where the added mixed aqueous solution is not satisfactorily diffused in the reaction vessel so that particles do not grow uniformly.

[Ammonium Ion Supplier]

The ammonium ion supplier in the reaction solution is not particularly limited as long as it is a water-soluble compound, and ammonia, ammonium sulfate, ammonium chloride, ammonium carbonate, ammonium fluoride and else may be used. For example, ammonia or ammonium sulfate is preferably used.

The concentration of ammonia in the reaction solution is adjusted to be preferably 3 g/L to 25 g/L, more preferably 5 g/L to 20 g/L, even more preferably 5 g/L to 15 g/L. When ammonium ions are present in the reaction solution, metal ions, especially, Ni ions form an ammine complex so that the solubility of metal ions is increased. This promotes the growth of primary particles so that dense composite hydroxide particles are likely to be obtained. Further, since the solubility of metal ions is stabilized, composite hydroxide particles uniform in shape and particle diameter are likely to be obtained. Particularly, when the concentration of ammonia in the reaction solution is 3 g/L to 25 g/L, more dense composite hydroxide particles uniform in shape and particle diameter are likely to be obtained.

If the concentration of ammonia in the reaction solution is less than 3 g/L, there is a case where the solubility of metal ions becomes unstable, and therefore primary particles uniform in shape and particle diameter are not formed, but gel-like nuclei are formed so that nickel cobalt manganese composite hydroxide particles having a wide particle size distribution are obtained. On the other hand, if the concentration of ammonia in the reaction solution exceeds 25 g/L, there is a case where the solubility of metal ions is excessively increased, and therefore the amount of metal ions remaining in the reaction aqueous solution is increased so that composition deviation occurs. The concentration of ammonium ions can be measured by a general ion meter.

[Alkali Solution]

The alkali solution is prepared as a mixed aqueous solution of an alkali metal hydroxide and a carbonate. The ratio of the carbonate to the alkali metal hydroxide ($[CO_3^{2-}]/[OH^-]$), which represents the mixing ratio between the alkali metal hydroxide and the carbonate, is 0.002 or more but 0.050 or less, preferably 0.005 or more but 0.030 or less, even more preferably 0.010 or more but 0.025 or less.

When the alkali solution is a mixed aqueous solution of an alkali metal hydroxide and a carbonate, anions such as sulfate radicals and chlorine that remain as impurities in a resulting nickel cobalt manganese composite hydroxide can be ion-exchanged for carbonate radicals in the crystallization step. The carbonate radicals are volatilized in the step of mixing a resulting nickel cobalt manganese composite hydroxide and a lithium compound and calcining the mixture, and therefore do not remain in a lithium nickel cobalt manganese composite oxide used as a positive electrode material.

If the ratio of the carbonate to the alkali metal hydroxide ($[CO_3^{2-}]/[OH^-]$) is less than 0.002, sulfate radicals and chlorine as impurities derived from raw materials are not sufficiently replaced with carbonate ions in the crystallization step, and therefore these impurities are likely to be incorporated into a resulting nickel cobalt manganese composite hydroxide. On the other hand, even when $[CO_3^{2-}]/[OH^-]$ exceeds 0.050, the effect of reducing sulfate radicals and chlorine as impurities derived from raw materials is not enhanced, and therefore an excess amount of the carbonate added increases costs.

The alkali metal hydroxide is preferably at least one selected from lithium hydroxide, sodium hydroxide, and potassium hydroxide, because the adding amount of such water-soluble compound can be easily controlled.

The carbonate is preferably at least one selected from sodium carbonate, potassium carbonate, and ammonium carbonate, because the adding amount of such water-soluble compound can be easily controlled.

Further, a method for adding the alkali solution to the reaction vessel is not particularly limited, and the alkali solution may be added by a pump that can control a flow rate, such as a metering pump, so that the pH of the reaction solution is maintained in a predetermined range that will be described later.

[pH Control]

The crystallization step more preferably comprises: a nucleation step in which nucleation is performed by adding an alkali solution to an aqueous solution so that a pH of a reaction solution (aqueous solution for nucleation) is 12.0 to 14.0 as a pH measured on the basis of a liquid temperature of 25° C.; and a particle growth step in which nuclei formed in the nucleation step are grown by controlling an aqueous solution for particle growth containing the nuclei by adding an alkali solution so that a pH of the reaction solution (aqueous solution for particle growth) is 10.5 to 12.0 as a pH measured on the basis of a liquid temperature of 25° C. That is, a nucleation reaction and a particle growth reaction do not proceed at the same time in the same vessel, but the time when a nucleation reaction mainly occurs (nucleation step) and the time when a particle growth reaction mainly occurs (particle growth step) are clearly separated from each other.

In the nucleation step, the pH of the reaction aqueous solution is controlled to be in the range of 12.0 to 14.0 as a pH measured on the basis of a liquid temperature of 25° C. If the pH exceeds 14.0, there is a problem that excessively fine nuclei are formed so that the reaction aqueous solution is gelled. On the other hand, if the pH is lower than 12.0, a nucleus growth reaction occurs together with nucleation so that non-uniform nuclei are formed which have a wide particle size distribution. Therefore, when the pH of the reaction aqueous solution is controlled to be 12.0 to 14.0 in the nucleation step, almost only nucleation is allowed to occur while nucleus growth is suppressed so that uniform nuclei are formed which have a narrow particle size distribution.

On the other hand, in the particle growth step, the pH of the reaction aqueous solution needs to be controlled to be in the range of 10.5 to 12.0, preferably 11.0 to 12.0 as a pH measured on the basis of a liquid temperature of 25° C. If the pH exceeds 12.0, many nuclei are newly formed so that fine secondary particles are formed, which makes it impossible to obtain a nickel cobalt manganese composite hydroxide having an excellent particle size distribution. Further, if the pH is lower than 10.5, the solubility of metal ions is increased by ammonium ions so that metal ions remaining in the solution without being precipitated are increased, which deteriorates production efficiency. That is, when the pH of the reaction aqueous solution is controlled to be 10.5 to 12.0 in the particle growth step, only the growth of nuclei formed in the nucleation step preferentially occurs so that formation of new nuclei can be suppressed, which makes it possible to obtain a uniform nickel cobalt manganese composite hydroxide having a narrow particle size distribution.

It is to be noted that when the pH is 12, the reaction aqueous solution is under the boundary condition between nucleation and particle growth. In this case, either the nucleation step or the particle growth step may be performed depending on the presence or absence of nuclei in the reaction aqueous solution. That is, when the pH in the nucleation step is adjusted to be higher than 12 to form a large amount of nuclei and then the pH in the particle growth step is adjusted to 12, a large amount of nuclei are present in the reaction aqueous solution, and therefore nucleus growth preferentially occurs so that the nickel cobalt manganese composite hydroxide having a narrow particle size distribution and a relatively large particle diameter is obtained.

On the other hand, when nuclei are not present in the reaction aqueous solution, that is, when the pH in the nucleation step is adjusted to 12, nucleation preferentially occurs because of the absence of nuclei to be grown, and therefore formed nuclei are grown by adjusting the pH in the particle growth step to less than 12 so that an excellent nickel cobalt manganese composite hydroxide is obtained.

In either case, the pH in the particle growth step shall be controlled to be lower than the pH in the nucleation step. In order to clearly separate nucleation and particle growth from each other, the pH in the particle growth step is preferably lower than the pH in the nucleation step by 0.5 or more, more preferably 1.0 or more.

As described above, by clearly separating the nucleation step and the particle growth step from each other by controlling the pH, nucleation preferentially occurs and nucleus growth hardly occurs in the nucleation step, and on the other hand, only nucleus growth occurs and new nuclei are hardly formed in the particle growth step. Therefore, uniform nuclei having a narrow particle size distribution can be formed in the nucleation step, and the nuclei can be uniformly grown in the particle growth step. Therefore, the process for producing a nickel cobalt manganese composite hydroxide makes it possible to obtain uniform nickel cobalt manganese composite hydroxide particles having a narrow particle size distribution.

[Temperature of Reaction Solution]

The temperature of the reaction solution in the reaction vessel is preferably set to 20 to 80° C., more preferably 30 to 70° C., even more preferably 35 to 60° C. If the temperature of the reaction solution is lower than 20° C., nucleation is likely to occur due to the low solubility of metal ions, which makes it difficult to control nucleation. On the other hand, if the temperature of the reaction solution exceeds 80° C., volatilization of ammonia is promoted, and therefore the ammonium ion supplier needs to be excessively added to maintain a predetermined ammonium ion concentration, which increases costs.

[Reaction Atmosphere]

The particle diameter and particle structure of the nickel cobalt manganese composite hydroxide are controlled also by a reaction atmosphere in the crystallization step.

When the atmosphere in the reaction vessel during the crystallization step is controlled to be a non-oxidizing atmosphere, the growth of primary particles that constitute a nickel cobalt manganese composite hydroxide is promoted so that secondary particles having an appropriately large particle diameter are formed from large and dense primary particles. Particularly, when the atmosphere during the crystallization step is a non-oxidizing atmosphere whose oxygen concentration is 5.0 vol % or less, preferably 2.5 vol % or less, more preferably 1.0 vol % or less, nuclei including relatively large primary particles are formed, and particle growth is promoted by aggregation of the primary particles so that secondary particles having an appropriate size can be obtained.

Such an atmosphere in the space inside the reaction vessel may be maintained by, for example, flowing an inert gas such as nitrogen into the space inside the reaction vessel and further bubbling an inert gas in the reaction solution.

EXAMPLES

Hereinafter, the present invention will be described in more detail with reference to examples and comparative examples, but the present invention is not limited to these examples. It is to be noted that the examples and the comparative examples were evaluated based on measurement results obtained using devices and processes that will be described below.

A nickel cobalt manganese composite hydroxide obtained by a crystallization step described in each of Examples 1 to 12 and Comparative Examples 1 to 4 was washed, subjected to solid-liquid separation, and dried to collect a powder, and the powder was subjected to various analyses by the following processes.

The composition of the nickel cobalt manganese composite hydroxide was determined by measuring a sample obtained by dissolving the nickel cobalt manganese composite hydroxide in nitric acid with an inductively-coupled plasma (ICP) emission spectrometer (ICPS-8100 manufactured by SHIMADZU CORPORATION).

The sulfate radical content of the nickel cobalt manganese composite hydroxide was determined by measuring the amount of a sulfur element in a sample obtained by dissolving the nickel cobalt manganese composite hydroxide in nitric acid with an ICP emission spectrometer (ICPS-8100 manufactured by SHIMADZU CORPORATION) and then converting the measured amount of a sulfur element into the amount of $SO_4$.

The chlorine content of the nickel cobalt manganese composite hydroxide was measured with an automatic titrator (COM-1600 manufactured by HIRANUMA SANGYO Co., Ltd.).

The carbonate radical content of the nickel cobalt manganese composite hydroxide was determined by measuring the total carbon element content of the nickel cobalt manganese composite hydroxide with a carbon/sulfur analyzer (CS-600 manufactured by LECO) and converting the measured amount of total carbon element into the amount of $CO_3$.

The specific surface area of the nickel cobalt manganese composite hydroxide was measured by a BET method using a specific surface area-measuring device (QUANTASORB QS-10 manufactured by Yuasa-Ionics Co., Ltd.).

A lithium nickel cobalt manganese composite oxide was produced and evaluated in the following manner. The nickel cobalt manganese composite hydroxide particles produced in each of examples and comparative examples were heat-treated in an air flow (oxygen: 21 vol %) at 700° C. for 6 hours, and the nickel cobalt manganese composite oxide particles were collected. Then, a lithium hydroxide was weighed so that the ratio of Li/Me was 1.025, and was mixed with the collected nickel cobalt manganese composite oxide particles to prepare a mixture. The mixing was performed using a shaker mixer (TURBULA TypeT2C manufactured by Willy A Bachofen (WAB)).

Then, the obtained mixture was subjected to pre-calcination at 500° C. for 4 hours and then finally calcined at 730° C. for 24 hours in an oxygen flow (oxygen: 100 vol %), cooled, and then disintegrated to obtain a lithium nickel cobalt manganese composite oxide.

The sulfate radical content of the obtained lithium nickel cobalt manganese composite oxide was determined by measuring the amount of a sulfur element in a sample obtained by dissolving the lithium nickel cobalt manganese composite oxide in nitric acid with an ICP emission spectrometer (ICPS-8100 manufactured by SHIMADZU CORPORATION) and then converting the measured amount of a sulfur element into the amount of $SO_4$.

The Me site occupancy factor of the lithium nickel cobalt manganese composite oxide, which represents crystallinity, was calculated by Rietveld refinement from a diffraction pattern obtained using an X-ray diffractometer (X'Pert PRO manufactured by PANalytical). In addition, Me site occupancy factor indicates a presence ratio of metal elements, i.e. Ni, Co, Mn and additive element M in nickel cobalt manganese composite oxide, which are occupied in metal layer (Me site) of layered structure. Me site occupancy factor is correlated with battery characteristic and it shows an excellent battery characteristic as Me site occupancy factor is higher.

It is to be noted that in each of Examples and Comparative Examples, a nickel cobalt manganese composite hydroxide was produced using special grade reagents manufactured by Wako Pure Chemical Industries, Ltd to each sample.

Example 1

In Example 1, a nickel cobalt manganese composite hydroxide was produced in the following manner using the process according to the present invention.

First, 0.9 L of water was placed in a reaction vessel (5 L), and the temperature in the reaction vessel was set to 40° C. while the water in the reaction vessel was stirred. Nitrogen gas was flowed into the reaction vessel to create a nitrogen atmosphere. At this time, the concentration of oxygen in the internal space of the reaction vessel was 2.0%.

Then, appropriate amounts of a 25% sodium hydroxide aqueous solution and 25% ammonia water were added to the water contained in the reaction vessel so that the pH of the reaction solution in the reaction vessel was adjusted to 12.8 as a pH measured on the basis of a liquid temperature of 25° C. Further, the concentration of ammonia in the reaction solution was adjusted to 10 g/L.

Then, nickel sulfate, cobalt chloride and manganese sulfate were dissolved in water to prepare a 2.0 mol/L of mixed aqueous solution. The mixed aqueous solution was adjusted so that the molar ratio among the metal elements was Ni:Co:Mn=1:1:1. Further, sodium hydroxide and sodium carbonate were dissolved in water so that $[CO_3^{2-}]/[OH^-]$ was 0.025 to prepare an alkali solution.

The mixed aqueous solution was added to the reaction solution in the reaction vessel at 12.9 mL/min. At the same time, 25% ammonia water and the alkali solution were also added to the reaction solution in the reaction vessel at constant rates so that the pH of the reaction solution was controlled to be 12.8 (pH in the nucleation step) while the concentration of ammonia in the reaction solution was maintained at 10 g/L. In this way, nucleation was performed by crystallization for 2 minutes 30 seconds.

Then, 64% sulfuric acid was added until the pH of the reaction solution reached 11.6 (pH in the particle growth step) as a pH measured on the basis of a liquid temperature of 25° C. Then, after the pH of the reaction solution reached 11.6 as a pH measured on the basis of a liquid temperature of 25° C., particle growth was performed by crystallization for 4 hours while controlling the pH at 11.6, by supplying the mixed aqueous solution, 25% ammonia water, and the alkali solution again, to obtain a nickel cobalt manganese composite hydroxide.

Example 2

In Example 2, a nickel cobalt manganese composite hydroxide was obtained and evaluated in the same manner as in Example 1 except that the molar ratio of each metal element in this mixed aqueous solution was adjusted so that Ni:Co:Mn=6:2:2, when preparing 2.0 mol/L of mixed aqueous solution by dissolving nickel sulfate, cobalt chloride and manganese sulfate in water.

Example 3

In Example 3, a nickel cobalt manganese composite hydroxide was obtained and evaluated in the same manner as in Example 1 except that the molar ratio of each metal element in this mixed aqueous solution was adjusted so that Ni:Co:Mn=2:1:7, when preparing 2.0 mol/L of mixed aqueous solution by dissolving nickel sulfate, cobalt chloride and manganese sulfate in water.

Example 4

In Example 4, a nickel cobalt manganese composite hydroxide was obtained and evaluated in the same manner as in Example 1 except that the alkali solution was prepared so that $[CO_3^{2-}]/[OH^-]$ was 0.003.

Example 5

In Example 5, a nickel cobalt manganese composite hydroxide was obtained and evaluated in the same manner as in Example 1 except that the alkali solution was prepared so that $[CO_3^{2-}]/[OH^-]$ was 0.040.

Example 6

In Example 6, a nickel cobalt manganese composite hydroxide was obtained and evaluated in the same manner as in Example 1 except that the pH in the nucleation step was 13.6.

Example 7

In Example 7, a nickel cobalt manganese composite hydroxide was obtained and evaluated in the same manner as in Example 1 except that the pH in the nucleation step was 11.8.

Example 8

In Example 8, a nickel cobalt manganese composite hydroxide was obtained and evaluated in the same manner as in Example 1 except that the pH in the particle growth step was 12.3.

Example 9

In Example 9, a nickel cobalt manganese composite hydroxide was obtained and evaluated in the same manner as in Example 1 except that the pH in the particle growth step was 10.2.

Example 10

In Example 10, a nickel cobalt manganese composite hydroxide was obtained and evaluated in the same manner as in Example 1 except that the alkali solution was prepared using potassium hydroxide as an alkali metal hydroxide and potassium carbonate as a carbonate.

Example 11

In Example 11, a nickel cobalt manganese composite hydroxide was obtained and evaluated in the same manner as in Example 1 except that carbonate was changed to ammonium carbonate and the concentration of ammonia was adjusted to 20 g/L.

Example 12

In Example 12, a nickel cobalt manganese composite hydroxide was obtained and evaluated in the same manner as in Example 1 except that the temperature in the reaction vessel was set to 35° C.

Comparative Example 1

In Comparative Example 1, a nickel cobalt manganese composite hydroxide was obtained and evaluated in the same manner as in Example 1 except that the molar ratio of each metal element in this mixed aqueous solution was adjusted so that Ni:Co:Mn=2:2:6, when preparing 2.0 mol/L of mixed aqueous solution by dissolving nickel sulfate, cobalt chloride and manganese sulfate in water, and that the alkali solution was prepared so that $[CO_3^{2-}]/[OH^-]$ was 0.001.

Comparative Example 2

In Comparative Example 2, a nickel cobalt manganese composite hydroxide was obtained and evaluated in the same manner as in Example 1 except that the alkali solution was prepared using only sodium hydroxide so that $[CO_3^{2-}]/[OH^-]$ was 0.000.

Comparative Example 3

In Comparative Example 3, a nickel cobalt manganese composite hydroxide was obtained and evaluated in the same manner as in Example 1 except that the alkali solution was prepared so that $[CO_3^{2-}]/[OH^-]$ was 0.001.

Comparative Example 4

In Comparative Example 4, a nickel cobalt manganese composite hydroxide was obtained and evaluated in the same manner as in Example 1 except that the alkali solution was prepared so that $[CO_3^{2-}]/[OH^-]$ was 0.055.

(Evaluation)

The production conditions of the nickel cobalt manganese composite hydroxides obtained in Examples 1 to 12 and Comparative Examples 1 to 4 are shown in Table 1. Further, the evaluation results of the nickel cobalt manganese composite hydroxides are shown in Table 2, and the evaluation results of the lithium nickel cobalt manganese composite oxides are shown in Table 3.

As shown in Tables 1 and 2, the nickel cobalt manganese composite hydroxides obtained in Examples 1 to 12 have an average particle diameter of 3 to 20 μm, a sulfate radical content of 1.0 mass % or less, a chlorine content of 0.5 mass % or less, and a carbonate radical content of 1.0 mass % to 2.5 mass %. Further, as can be seen from Table 3, the lithium nickel cobalt manganese composite oxides obtained in Examples 1 to 12 have a Me site occupancy factor, which represents crystallinity, of higher than 90.0%, and are therefore excellent in crystallinity and useful as a positive electrode active material.

On the other hand, in Comparative Examples 1 to 3, $[CO_3^{2-}]/[OH^+]$ representing the mixing ratio between the alkali metal hydroxide and the carbonate in the alkali solution was lower than 0.002, and therefore the sulfate radical content and the chlorine content were high. Further, a Me site occupancy factor of the lithium nickel cobalt manganese composite oxide, which represents crystallinity, was lower than 90.0%, and were therefore inferior to that obtained in Example 1 having the similar composition ratio and else.

In Comparative Example 4, $[CO_3^{2-}]/[OH^+]$ representing the mixing ratio between the alkali metal hydroxide and the carbonate in the alkali solution was higher than 0.050, and therefore the carbonate radical content was high. Further, a Me site occupancy factor of the lithium nickel cobalt manganese composite oxide, which represents crystallinity, was lower than 90.0%, and were therefore inferior to that obtained in Example 1 having the similar composition ratio and else.

As can be seen from the above results, when a nickel cobalt manganese composite hydroxide is produced using the process for producing a nickel cobalt manganese composite hydroxide according to the present invention, a lithium nickel cobalt manganese composite oxide having high crystallinity is obtained, and such a lithium nickel cobalt manganese composite oxide is useful as a positive electrode material for high-capacity non-aqueous electrolyte secondary batteries.

TABLE 1

| | Ni:Co:Mn | $[CO_3^{2-}]/[OH^-]$ | pH in nucleation step | pH in particle growth step | Alkali metal hydroxides | Carbonates | Concentration of ammonia [g/L] | Reaction temperature [° C.] |
|---|---|---|---|---|---|---|---|---|
| Example 1 | 1:1:1 | 0.025 | 12.8 | 11.6 | Sodium hydroxide | Sodium carbonate | 10 | 40 |
| Example 2 | 6:2:2 | 0.025 | 12.8 | 11.6 | Sodium hydroxide | Sodium carbonate | 10 | 40 |
| Example 3 | 2:1:7 | 0.025 | 12.8 | 11.6 | Sodium hydroxide | Sodium carbonate | 10 | 40 |
| Example 4 | 1:1:1 | 0.003 | 12.8 | 11.6 | Sodium hydroxide | Sodium carbonate | 10 | 40 |
| Example 5 | 1:1:1 | 0.040 | 12.8 | 11.6 | Sodium hydroxide | Sodium carbonate | 10 | 40 |
| Example 6 | 1:1:1 | 0.025 | 13.6 | 11.6 | Sodium hydroxide | Sodium carbonate | 10 | 40 |
| Example 7 | 1:1:1 | 0.025 | 11.8 | 11.6 | Sodium hydroxide | Sodium carbonate | 10 | 40 |
| Example 8 | 1:1:1 | 0.025 | 12.8 | 12.3 | Sodium hydroxide | Sodium carbonate | 10 | 40 |
| Example 9 | 1:1:1 | 0.025 | 12.8 | 10.2 | Sodium hydroxide | Sodium carbonate | 10 | 40 |
| Example 10 | 1:1:1 | 0.025 | 12.8 | 11.6 | Potassium hydroxide | Potassium carbonate | 10 | 40 |
| Example 11 | 1:1:1 | 0.025 | 12.8 | 11.6 | Sodium hydroxide | Ammonium carbonate | 20 | 40 |
| Example 12 | 1:1:1 | 0.025 | 12.8 | 11.6 | Sodium hydroxide | Sodium carbonate | 10 | 35 |

TABLE 1-continued

|  | Ni:Co:Mn | [CO$_3^{2-}$]/ [OH$^-$] | pH in nucleation step | pH in particle growth step | Alkali metal hydroxides | Carbonates | Concentration of ammonia [g/L] | Reaction temperature [° C.] |
|---|---|---|---|---|---|---|---|---|
| Comparative Example 1 | 2:2:6 | 0.001 | 12.8 | 11.6 | Sodium hydroxide | Sodium carbonate | 10 | 40 |
| Comparative Example 2 | 1:1:1 | 0.000 | 12.8 | 11.6 | Sodium hydroxide | — | 10 | 40 |
| Comparative Example 3 | 1:1:1 | 0.001 | 12.8 | 11.6 | Sodium hydroxide | Sodium carbonate | 10 | 40 |
| Comparative Example 4 | 1:1:1 | 0.055 | 12.8 | 11.6 | Sodium hydroxide | Sodium carbonate | 10 | 40 |

TABLE 2

|  | Sulfate radical [mass %] | Chlorine [mass %] | Carbonate radical [mass %] | Average particle diameter [μm] | (d90-d10)/ average particle diameter | Specific surface area [m$^2$/g] |
|---|---|---|---|---|---|---|
| Example 1 | 0.33 | 0.08 | 1.2 | 7.0 | 0.51 | 12 |
| Example 2 | 0.32 | 0.12 | 1.2 | 7.0 | 0.52 | 11 |
| Example 3 | 0.35 | 0.11 | 1.1 | 7.2 | 0.53 | 13 |
| Example 4 | 0.28 | 0.10 | 1.0 | 6.8 | 0.50 | 12 |
| Example 5 | 0.38 | 0.14 | 1.3 | 7.4 | 0.53 | 11 |
| Example 6 | 0.30 | 0.12 | 2.2 | 7.2 | 0.50 | 18 |
| Example 7 | 0.36 | 0.10 | 1.1 | 7.3 | 0.48 | 18 |
| Example 8 | 0.34 | 0.11 | 1.3 | 6.9 | 0.47 | 15 |
| Example 9 | 0.33 | 0.13 | 1.2 | 6.8 | 0.49 | 14 |
| Example 10 | 0.30 | 0.14 | 1.6 | 7.0 | 0.59 | 14 |
| Example 11 | 0.31 | 0.13 | 1.5 | 6.8 | 0.51 | 19 |
| Example 12 | 0.33 | 0.12 | 1.2 | 7.5 | 0.49 | 16 |
| Comparative Example 1 | 1.35 | 0.12 | 1.1 | 7.7 | 0.60 | 52 |
| Comparative Example 2 | 1.21 | 0.37 | 0.4 | 7.3 | 0.48 | 18 |
| Comparative Example 3 | 1.18 | 0.33 | 0.5 | 7.0 | 0.51 | 13 |
| Comparative Example 4 | 0.32 | 0.10 | 3.1 | 6.7 | 0.59 | 14 |

TABLE 3

|  | Sulfate radical content in lithium nickel cobalt manganese composite oxide [mass %] | Me site occupancy factor |
|---|---|---|
| Example 1 | 0.33 | 91.1 |
| Example 2 | 0.32 | 92.2 |
| Example 3 | 0.35 | 91.3 |
| Example 4 | 0.28 | 93.1 |
| Example 5 | 0.38 | 92.2 |
| Example 6 | 0.30 | 91.3 |
| Example 7 | 0.36 | 93.2 |
| Example 8 | 0.34 | 93.1 |
| Example 9 | 0.33 | 92.2 |
| Example 10 | 0.30 | 91.1 |
| Example 11 | 0.31 | 92.3 |
| Example 12 | 0.33 | 91.5 |
| Comparative Example 1 | 1.35 | 88.7 |
| Comparative Example 2 | 1.21 | 89.1 |
| Comparative Example 3 | 1.18 | 89.2 |
| Comparative Example 4 | 0.32 | 89.1 |

The nickel cobalt manganese composite hydroxide according to the present invention can be used as a precursor of a battery material not only for electric cars driven only by electric energy but also for so-called hybrid cars that also use a combustion engine such as a gasoline engine or a diesel engine. It is to be noted that power sources for electric cars include not only power sources for electric cars driven only by electric energy but also power sources for so-called hybrid cars that also use a combustion engine such as a gasoline engine or a diesel engine, and a non-aqueous electrolyte secondary battery using the nickel cobalt manganese composite hydroxide according to the present invention as raw material can also be suitably used as a power source for such hybrid cars.

The invention claimed is:

1. A nickel cobalt manganese composite hydroxide represented by a general formula: $Ni_xCo_yMn_zM_t(OH)_{2+a}$ (wherein x+y+z+t=1, 0.20≤x≤0.80, 0.10≤y≤0.50, 0.10≤z≤0.90, 0≤t≤0.10, 0≤a≤0.5, and M is at least one additive element selected from Mg, Ca, Al, Ti, V, Cr, Zr, Nb, Mo, W, the nickel cobalt manganese composite hydroxide comprising:
spherical secondary particles formed by aggregation of a plurality of plate-shaped primary particles,
wherein the secondary particles have an average particle diameter of 3 μm to 20 μm, a sulfate radical content of 1.0 mass % or less, a chlorine content of 0.5 mass % or less, and a carbonate radical content of 1.0 mass % to 2.5 mass %.

2. The nickel cobalt manganese composite hydroxide according to claim 1, wherein a value of [(d90−d10)/average particle diameter], which is an index indicating dispersion of particle size distribution of the nickel cobalt manganese composite hydroxide, is 0.55 or less.

3. The nickel cobalt manganese composite hydroxide according to claim 1, wherein a specific surface area is 5 $m^2/g$ to 60 $m^2/g$.

4. A process for producing the nickel cobalt manganese composite hydroxide of claim 1, the process comprising:
   a crystallization step in which crystallization is performed in a reaction solution obtained by adding an alkali solution to an aqueous solution containing a mixed aqueous solution containing at least nickel, cobalt and manganese, and an ammonium ion supplier,
   wherein the alkali solution is a mixed aqueous solution of an alkali metal hydroxide and a carbonate, and a ratio of the carbonate to the alkali metal hydroxide in the mixed aqueous solution represented by $[CO_3^{2-}]/[OH^-]$ is 0.002 or more and 0.050 or less.

5. The process for producing the nickel cobalt manganese composite hydroxide according to claim 4, wherein the crystallization step comprises a nucleation step and a particle growth step, and wherein
   in the nucleation step, a nucleation is performed in the reaction solution obtained by adding the alkali solution to the aqueous solution so that a pH of the reaction solution is 12.0 to 14.0 as pH measured on the basis of a liquid temperature of 25° C., and
   in the particle growth step, the alkali solution is added to the reaction solution containing nuclei formed in the nucleation step so that a pH of the reaction solution is 10.5 to 12.0 as pH measured on the basis of a liquid temperature of 25° C.

6. The process for producing a nickel cobalt manganese composite hydroxide according to claim 4, wherein the alkali metal hydroxide is at least one selected from lithium hydroxide, sodium hydroxide, and potassium hydroxide.

7. The process for producing a nickel cobalt manganese composite hydroxide according to claim 4, wherein the carbonate is at least one selected from sodium carbonate, potassium carbonate, and ammonium carbonate.

8. The process for producing a nickel cobalt manganese composite hydroxide according to claim 4, wherein in the crystallization step, an ammonia concentration of the reaction solution is maintained in a range of 3 g/L to 25 g/L.

9. The process for producing a nickel cobalt manganese composite hydroxide according to claim 4, wherein in the crystallization step, a reaction temperature is maintained in a range of 20° C. to 80° C.

* * * * *